(12) United States Patent
Coyle et al.

(10) Patent No.: US 12,501,288 B2
(45) Date of Patent: Dec. 16, 2025

(54) SYSTEMS AND METHODS FOR SELECTING A MACHINE LEARNING MODEL THAT PREDICTS A SUBSCRIBER NETWORK EXPERIENCE IN A GEOGRAPHIC AREA

(71) Applicant: Verizon Patent and Licensing Inc., Basking Ridge, NJ (US)

(72) Inventors: Timothy E. Coyle, Chicopee, MA (US); Deborah Lynn Liske, Durham, NC (US); Matthew Kapala, North Billerica, MA (US); Syed Rehman, South Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 760 days.

(21) Appl. No.: 17/931,615

(22) Filed: Sep. 13, 2022

(65) Prior Publication Data

US 2024/0089757 A1    Mar. 14, 2024

(51) Int. Cl.
| | |
|---|---|
| *H04W 24/04* | (2009.01) |
| *G06N 20/00* | (2019.01) |
| *H04W 24/02* | (2009.01) |
| *H04W 24/10* | (2009.01) |

(52) U.S. Cl.
CPC ............ *H04W 24/04* (2013.01); *G06N 20/00* (2019.01); *H04W 24/02* (2013.01); *H04W 24/10* (2013.01)

(58) Field of Classification Search
CPC ..... H04W 24/04; H04W 24/02; H04W 24/10; H04W 4/029; H04W 4/021; G06N 20/00; H04L 41/16
See application file for complete search history.

(56) References Cited

U.S. PATENT DOCUMENTS

| | | | |
|---|---|---|---|
| 11,109,194 B1* | 8/2021 | Pinheiro | H04W 4/029 |
| 2022/0416855 A1* | 12/2022 | Oh | H04W 16/28 |
| 2023/0209367 A1* | 6/2023 | Chang | G06N 20/00 |
| | | | 455/423 |

* cited by examiner

*Primary Examiner* — Marcus Smith
*Assistant Examiner* — Zhaohui Yang

(57) ABSTRACT

A device may receive network data identifying key performance indicators associated with a base station and user equipment (UEs), UE data identifying UE data records and UE locations, and geographic data identifying a geographic area and features of the geographic area. The device may correlate the network data, the UE data, and the geographic data to generate correlated data. The device may process, the correlated data, with a plurality of machine learning models, to generate a corresponding plurality of results, and may evaluate the plurality of results, with prediction models, to generate a set of results. The device may compare classification cost function weighted predictions and the set of results to generate comparisons, and may select a machine learning model, for the geographic area and from the plurality of machine learning models, based on the comparisons. The device may implement the machine learning model for the geographic area.

20 Claims, 11 Drawing Sheets

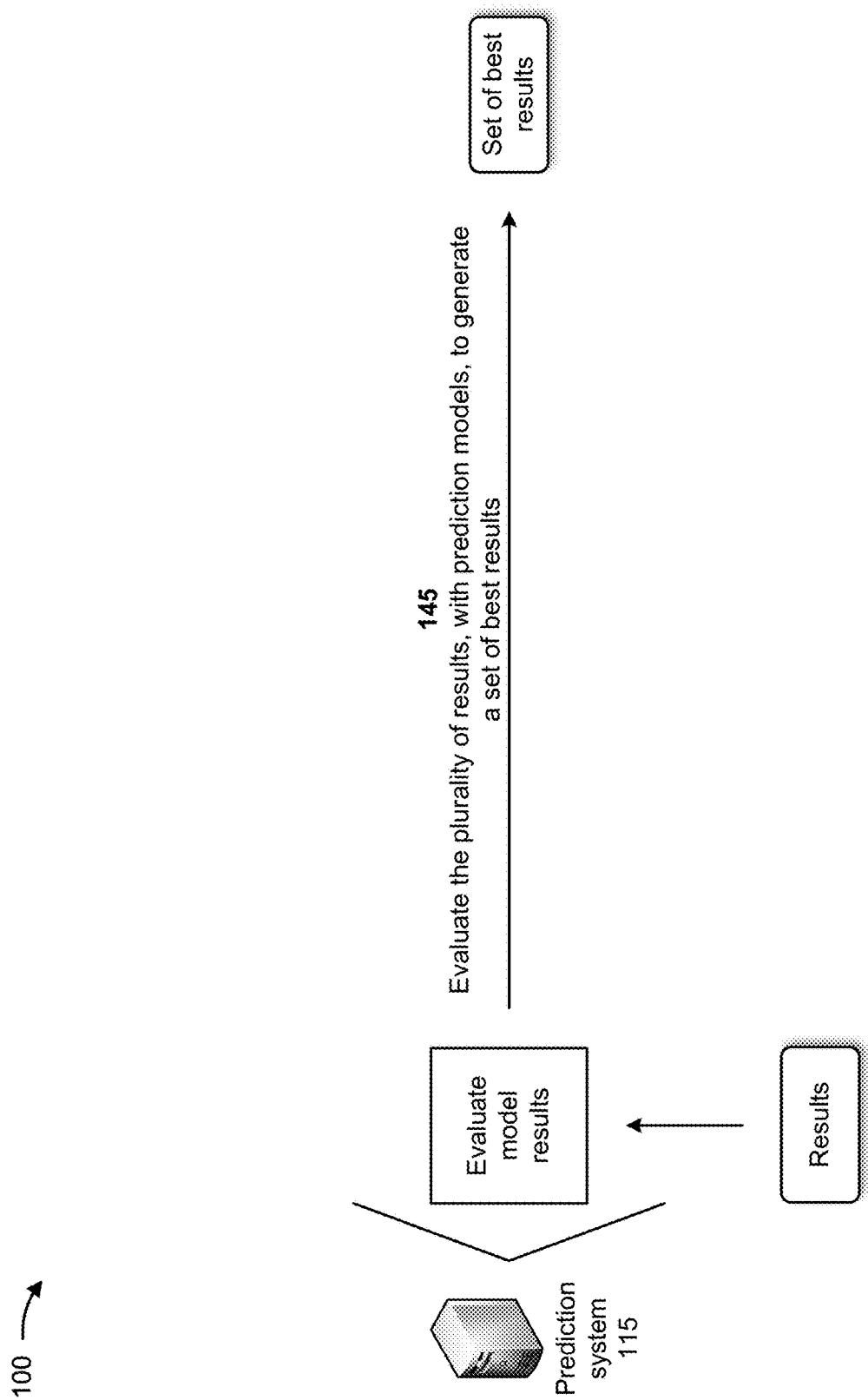

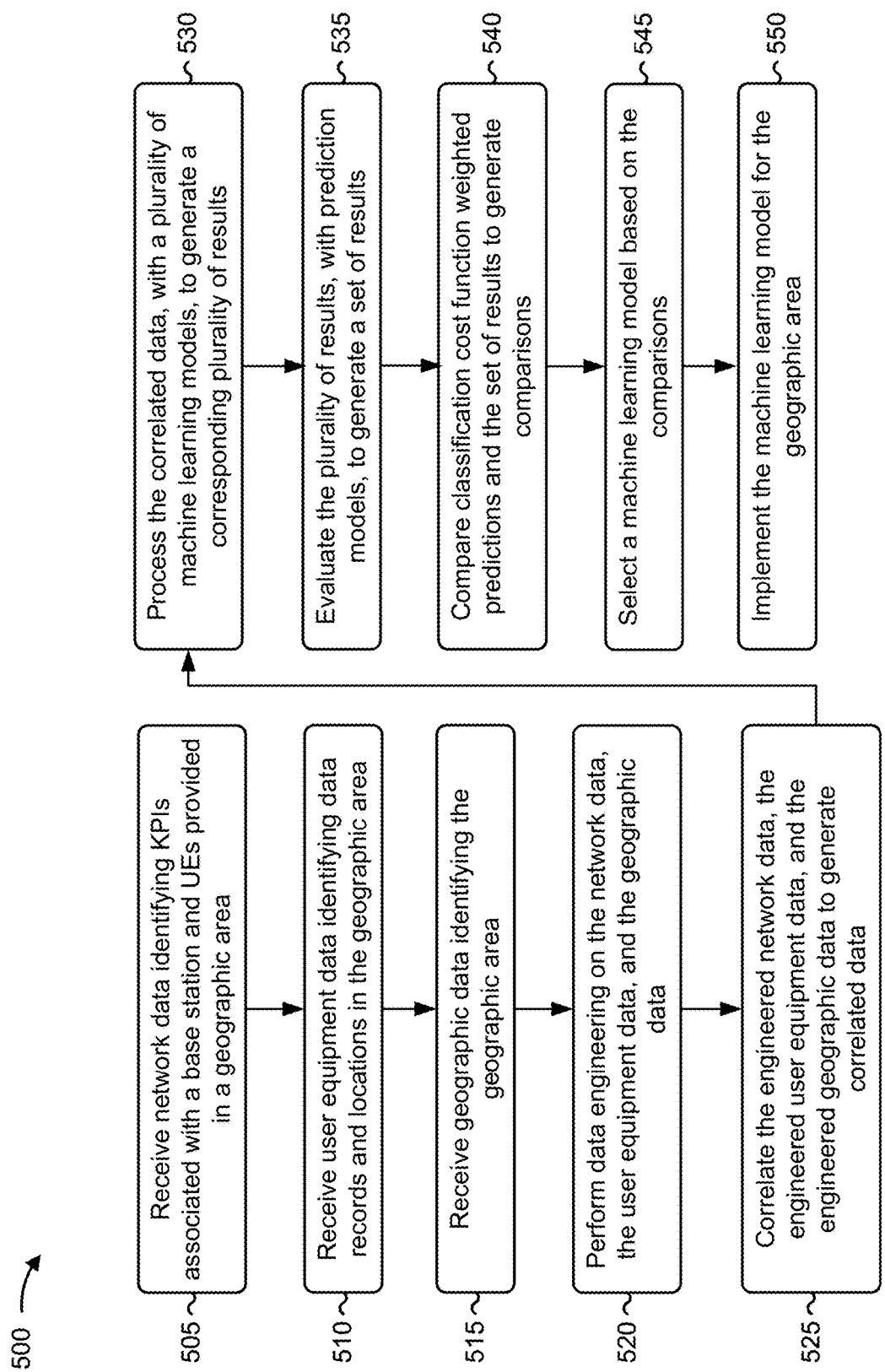

SYSTEMS AND METHODS FOR SELECTING A MACHINE LEARNING MODEL THAT PREDICTS A SUBSCRIBER NETWORK EXPERIENCE IN A GEOGRAPHIC AREA

BACKGROUND

A base station may include one or more antennas that transmit and receive radio waves for a radio access network (RAN) (e.g., a serving cell) in a geographic area associated with subscribers (e.g., user equipment (UEs)). Generalization of a subscriber experience for an entire serving cell may fail to provide an actual subscriber experience for each UE since the generalization fails to consider an actual environment of each UE and other external factors that may affect the actual subscriber experience.

BRIEF DESCRIPTION OF THE DRAWINGS

FIGS. 1A-1G are diagrams of an example associated with selecting a machine learning model that predicts a subscriber network experience in a geographic area.

FIG. 5 is a flowchart of an example process for selecting a machine learning model that predicts a subscriber network experience in a geographic area.

DETAILED DESCRIPTION OF EXAMPLE EMBODIMENTS

Figure 1A:
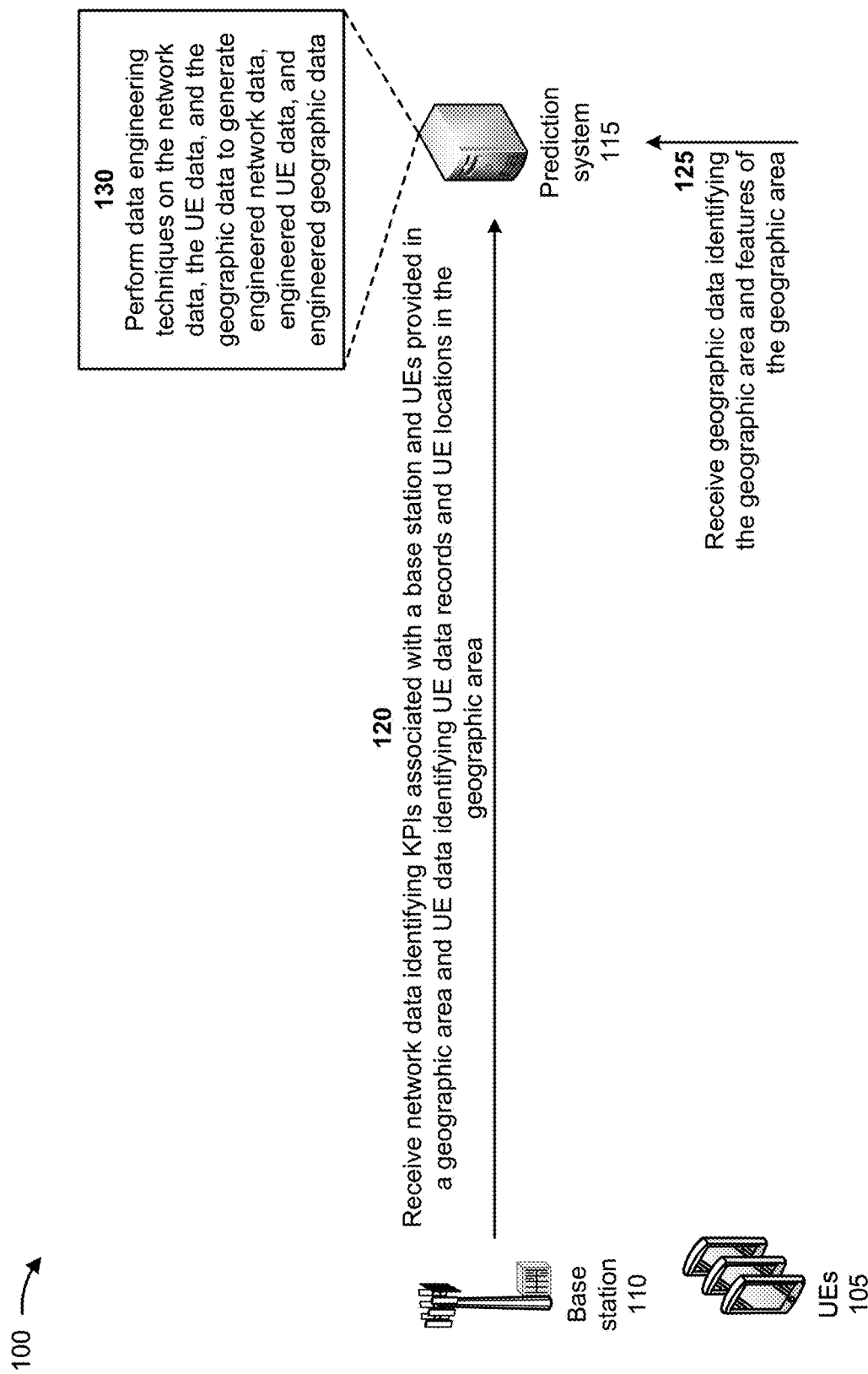

The following detailed description of example implementations refers to the accompanying drawings. The same reference numbers in different drawings may identify the same or similar elements.

Current techniques for estimating wireless subscriber (e.g., the UE) performance (e.g., throughput) are based on a serving cell provided by a base station, and not specifically on a geographic location of the UE. This leads to a generalization of the subscriber experience for the entire serving cell, regardless of an actual environment of the UE and other external factors that may affect the experience. For example, a base station may provide a serving cell in a geographic area that includes a first area with no obstructions (e.g., buildings, trees, hills, and/or the like) and a second area with obstructions. Thus, the subscriber experience in the first area may be better than the subscriber experience in the second area. Generalizing the serving cell experience based on the first area or based on the second area may lead to an inaccurate estimate of subscriber experience in either the first area or the second area, which may lead to poorer actual subscriber experiences in both the first area and the second area.

Thus, current techniques for estimating subscriber experience may improperly allocate computing resources (e.g., processing resources, memory resources, communication resources, and/or the like), networking resources, and/or other resources associated with providing a poor subscriber experience in a serving cell of a network or in portions of the serving cell, dispatching technicians to service the network based on poor estimates of the subscriber experience for the serving cell, unnecessarily modifying parameters of the network based on the poor estimates of the subscriber experience for the serving cell, and/or the like.

Some implementations described herein provide a prediction system that selects a machine learning model for predicting a subscriber network experience in a geographic area. For example, the prediction system may receive network data identifying key performance indicators associated with a base station and UEs provided in a geographic area, UE data identifying UE data records and UE locations in the geographic area, and geographic data identifying the geographic area and features of the geographic area. The prediction system may perform data engineering on the network data, the UE data, and the geographic data to generate engineered network data, engineered UE data, and engineered geographic data, respectively, and may correlate the engineered network data, the engineered UE data, and the engineered geographic data to generate correlated data. The prediction system may train a plurality of machine learning models with the correlated data to generate a corresponding plurality of results, and may evaluate the plurality of results, with prediction models, to generate a set of results. The prediction system may compare classification cost function weighted predictions and the set of results to generate comparisons, and may select a machine learning model, for the geographic area and from the plurality of machine learning models, based on the comparisons. The prediction system may implement the machine learning model for the geographic area.

In this way, the prediction system selects a machine learning model for predicting a subscriber network experience in a geographic area. For example, the prediction system may utilize network data, subscriber UE data, estimated locations of the UEs, and enriched geographic data to train and select a machine learning model that identifies a performance of a network in specific geographic area. The prediction system may utilize the machine learning model to predict a subscriber experience of a UE as the UE moves through a serving cell of the network from a geographic perspective. The prediction system may implement proactive network improvements and real-time device level optimization based on the predicted subscriber experience. Thus, the prediction system may conserve computing resources, networking resources, and/or other resources that would have otherwise been consumed by providing a poor subscriber experience in a serving cell of the base station or in portions of the serving cell, dispatching technicians to service the network based on poor estimates of the subscriber experience for the serving cell, unnecessarily modifying parameters of the network based on the poor estimates of the subscriber experience for the serving cell, and/or the like.

FIGS. 1A-1G are diagrams of an example 100 associated with selecting a machine learning model that predicts a subscriber network experience in a geographic area. As shown in FIGS. 1A-1G, example 100 includes a plurality of UEs 105 associated with a base station 110 and a prediction system 115. Further details of the UEs 105, the base station 110, and the prediction system 115 are provided elsewhere herein.

As shown in FIG. 1A, and by reference number 120, the prediction system 115 may receive network data identifying key performance indicators (KPIs) associated with the base station 110 and the UEs 105 provided in a geographic area and UE data identifying UE data records and UE locations in the geographic area. For example, measurements may be calculated by performance counters associated with the base station 110 and/or the UEs 105. The measurements may include events (e.g., connections, traffic transmission, traffic reception, and/or the like) recorded by the performance counters associated with the base station 110 and/or the UEs 105. The network data (e.g., the KPIs) may be calculated based on the measurements (e.g., the recorded events). The KPIs may include bandwidths, throughputs, signal strengths, indications of service availability (e.g., percentages of time that the base station 110 is providing services to the UEs 105), indications of network resources (e.g., traffic and control channels provided by the base station 110), indications of handovers (e.g., a handover of a moving UE 105 from one base station 110 to another base station 110), voice service indicators, data service indicators, and/or the like.

In some implementations, the prediction system 115 may receive the measurements and/or signaling from the UEs 105 and/or the base station 110, and may calculate the KPIs based on the measurements and/or the signaling. In some implementations, the base station 110 may calculate the KPIs based on the measurements and/or the signaling, and may provide the KPIs to the prediction system 115.

The UE data may include data identifying call records associated with the UEs 105 over time, application utilization by the UEs 105 over time, data usage associated with the UEs 105 over time, geographic locations of the UEs 105 in the geographic area over time, and/or the like. The prediction system 115 may periodically receive the network data and/or the UE data from the UEs 105 and/or the base station 110, may continuously receive the network data and/or the UE data from the UEs 105 and/or the base station 110, may receive the network data and/or the UE data based on providing a request for the network data and/or the UE data to the UEs 105 and/or the base station 110, and/or the like.

As further shown in FIG. 1A, and by reference number 125, the prediction system 115 may receive geographic data identifying the geographic area and features of the geographic area. For example, the prediction system 115 may receive the geographic data from the Military Grid Reference System (MGRS), which is a geocoordinate standard used for locating points on Earth. The geographic data may include data identifying the geographic area via MGRS grid squares. A grid square may include a square with a particular side length (e.g., ten kilometers, one kilometer, one hundred meters, ten meters, or one meter), depending on a precision of the coordinates provided. The geographic data may include data identifying the features of the geographic area, such as buildings, streets, highways, forests, mountains, urban center, highway interchanges, rural areas, neighborhoods, and/or the like.

As further shown in FIG. 1A, and by reference number 130, the prediction system 115 may perform data engineering techniques on the network data, the UE data, and the geographic data to generate engineered network data, engineered UE data, and engineered geographic data. For example, when performing the data engineering techniques, the prediction system 115 may perform a data cleansing technique on the network data, the UE data, and the geographic data to generate the engineered network data, the engineered UE data, and the engineered geographic data. The data cleansing technique may remove, from the network data, the UE data, and/or the geographic data, data that is constant over a time period, in order to generate the engineered network data, the engineered UE data, and the engineered geographic data. In some implementations, when performing the data engineering techniques, the prediction system 115 may perform a scaling technique on the network data, the UE data, and the geographic data to generate the engineered network data, the engineered UE data, and the engineered geographic data. For example, the scaling technique may normalize the network data, the UE data, and the geographic data to generate the engineered network data, the engineered UE data, and the engineered geographic data.

In some implementations, when performing the data engineering techniques, the prediction system 115 may perform a feature engineering technique on the network data, the UE data, and the geographic data to generate the engineered network data, the engineered UE data, and the engineered geographic data. For example, the prediction system 115 may utilize geospatial feature engineering on the geographic data. Geospatial feature engineering is utilizing geospatial data to create new features for machine learning models, where the new features may enhance the geographic data. The prediction system 115 may aggregate individual data points of the geographic data by the MGRS grid, and may enrich the geographic data by using geospatial datasets since selective geospatial features may better a behavior of a UE 105.

In some implementations, when performing the data engineering techniques, the prediction system 115 may perform a binning technique on the network data, the UE data, and the geographic data to generate the engineered network data, the engineered UE data, and the engineered geographic data. Data binning is a data pre-processing technique used to reduce the effects of minor observation errors. The original data values which fall into a given small interval, a bin, are replaced by a value representative of that interval, often a central value. Data binning of the network data, the UE data, and the geographic data may reduce noise associated with the network data, the UE data, and the geographic data.

Figure 1B:
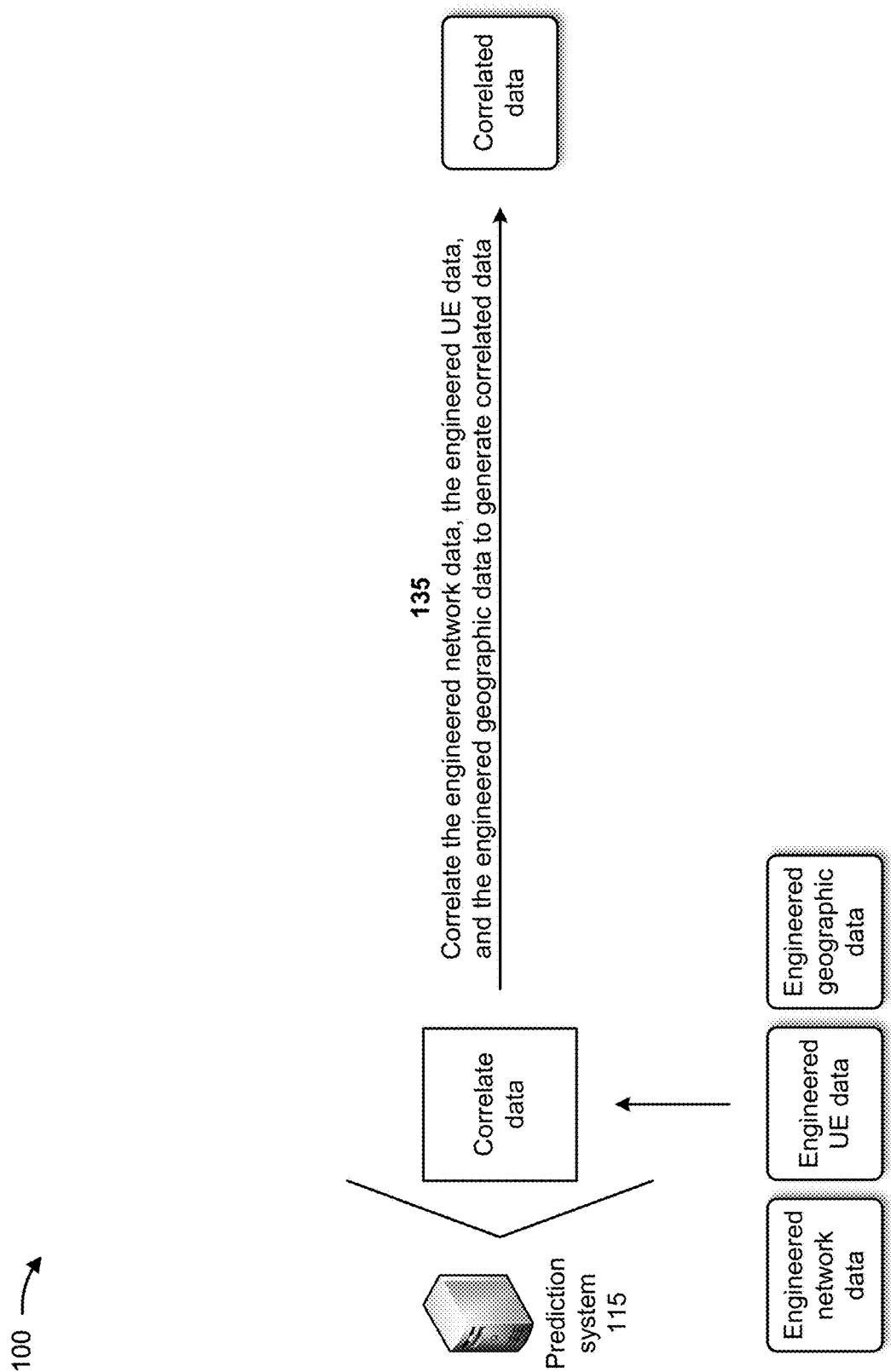

As shown in FIG. 1B, and by reference number 135, the prediction system 115 may correlate the engineered network data, the engineered UE data, and the engineered geographic data to generate correlated data. For example, the prediction system 115 may process the engineered network data, the engineered UE data, and the engineered geographic data, with a correlation model, to generate the correlated data. In some implementations, the correlation model may include a Pearson correlation model. The Pearson correlation model may assign, to each correlation, a value between negative one (−1) and one (1), where zero (0) indicates no correlation, one (1) indicates a total positive correlation, and negative one (−1) indicates a total negative correlation. The correlation model may utilize tunable and highly correlated thresholds to determine correlations between the engineered network data, the engineered UE data, and the engineered geographic data. The correlation model may utilize tunable business requirements to determine correlations for different combinations of the engineered network data, the engineered UE data, and the engineered geographic data. The correlation model may output the correlated data identifying the correlations between the engineered network data, the engineered UE data, and the engineered geographic data.

Figure 1C:
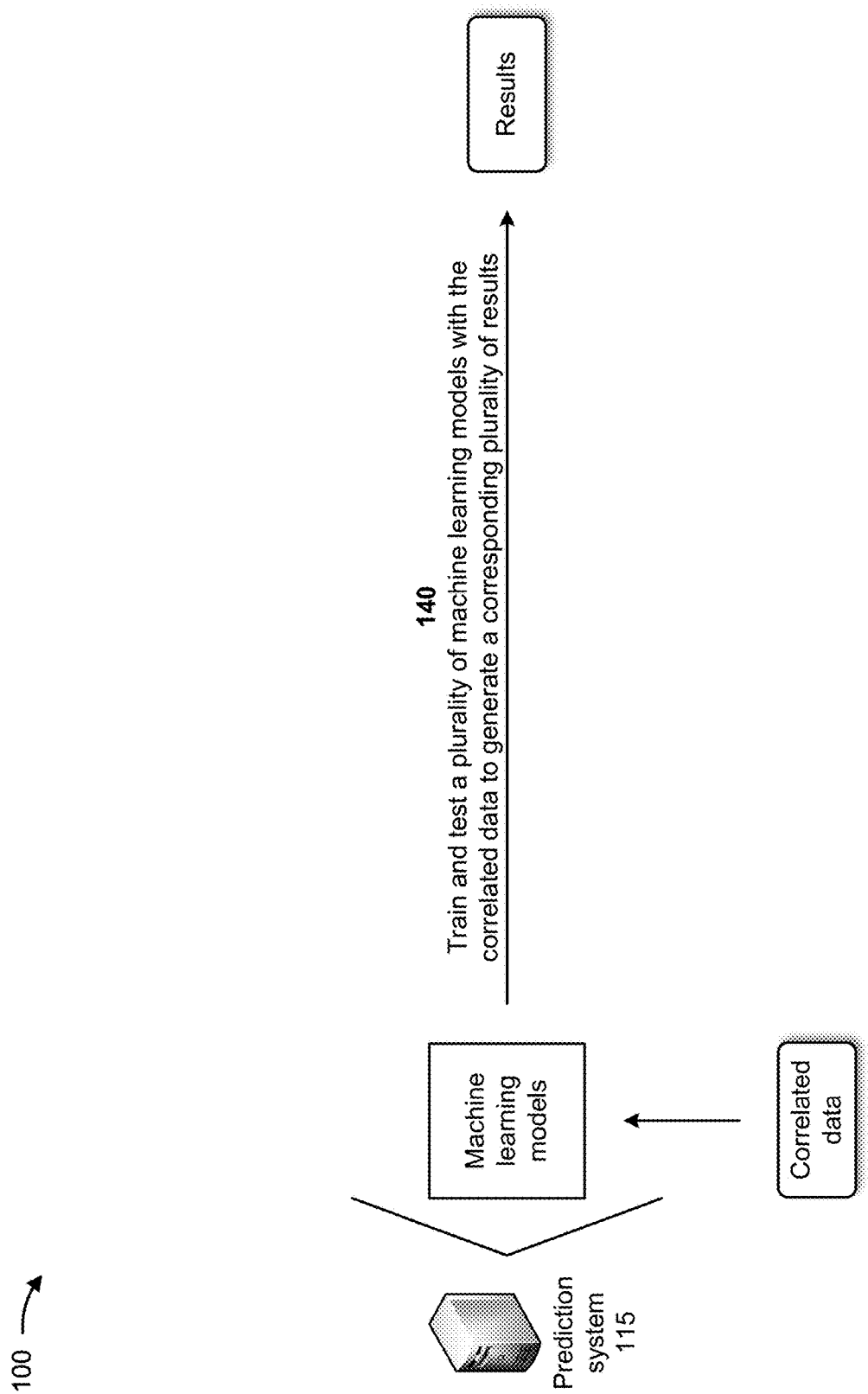

As shown in FIG. 1C, and by reference number 140, the prediction system 115 may train and test a plurality of machine learning models with the correlated data to generate a corresponding plurality of results. For example, the prediction system 115 may divide the correlated data into a first portion of correlated data, a second portion of correlated data, and a third portion of correlated data. The first portion, the second portion, and the third portion may include a same quantity of the correlated data, different quantities of the correlated data, and/or the like. In some implementations, more of the correlated data may be allotted to the first portion of correlated data since the first portion may be utilized to generate the training data set for the machine learning model.

The prediction system 115 may generate a training dataset for the plurality of machine learning models based on the first portion of correlated data. The prediction system 115 may generate a validation dataset for the plurality of machine learning models based on the second portion of correlated data. The prediction system 115 may generate a test dataset for the plurality of machine learning models based on the third portion of correlated data. In other implementations, the prediction system 115 may utilize different portions of the correlated data to generate the training dataset, the validation dataset, and/or the test dataset for the machine learning model.

The prediction system 115 may train a plurality of machine learning models with the training dataset to generate the results. As described elsewhere herein, the machine learning model may be trained to process real time network data associated with the base station 110 and real time UE data associated with the UEs 105, and identify subscriber experiences (e.g., of the UEs 105) in a coverage area of the base station 110. The subscriber experiences may include latencies, throughputs, quality of service, and/or the like received by the UEs 105 from the base station 110. In some implementations, rather than training the machine learning model, the prediction system 115 may obtain the trained plurality of machine learning models from another system or device that trained the plurality of machine learning models. In this case, the prediction system 115 may provide the other system or device with the training dataset, the validation dataset, and/or the test dataset for use in training the plurality of machine learning models, and may provide the other system or device with updated training, validation, and/or test datasets to retrain the plurality of machine learning models in order to update the plurality of machine learning models.

In some implementations, the prediction system 115 may train the plurality of machine learning models with the training dataset to generate the results, and may process the validation dataset, with the plurality of machine learning models, to validate that the plurality of machine learning models are operating correctly. If the trained machine learning model is operating correctly, the prediction system 115 may process the plurality of machine learning models, with the test dataset, to further ensure that the plurality of machine learning models are operating correctly. A machine learning model can be said to be operating correctly if it has adequate accuracy, has adequate precision, has adequate recall, is not subject to excessive overfitting, and/or the like. If the plurality of machine learning models are operating excessively incorrect, the prediction system 115 may modify the plurality of machine learning models and may revalidate and/or retest the modified plurality of machine learning models based on the validation dataset and/or the test dataset.

In some implementations, the prediction system 115 may modify the correlated data utilized to train the plurality of machine learning models. For example, the prediction system 115 may utilize logarithmic transformation to modify the correlated data (e.g., for skewed target features), which may radically improve results generated by the plurality of machine learning models. In another example, the prediction system 115 may utilize input feature transformation to modify the correlated data, which may address sparsity in a feature set and improve results generated by the plurality of machine learning models.

As shown in FIG. 1D, and by reference number 145, the prediction system 115 may evaluate the plurality of results, with prediction models, to generate a set of best results. For example, when evaluating the plurality of results, with the prediction models, to generate the set of best results, the prediction system 115 may evaluate the plurality of results, with a mean absolute error prediction model, to generate a first portion of the set of best results. The prediction system 115 may evaluate the plurality of results, with a standard deviation prediction model, to generate a second portion of the set of best results, and may combine the first portion and the second portion to generate the set of best results. In some implementations, when evaluating the plurality of results, with the prediction models, to generate the set of best results, the prediction system 115 may process the plurality of results, with the prediction models, to generate a ranked list of the plurality of results, and may select the set of best results based on the ranked list of the plurality of results.

Figure 1E:
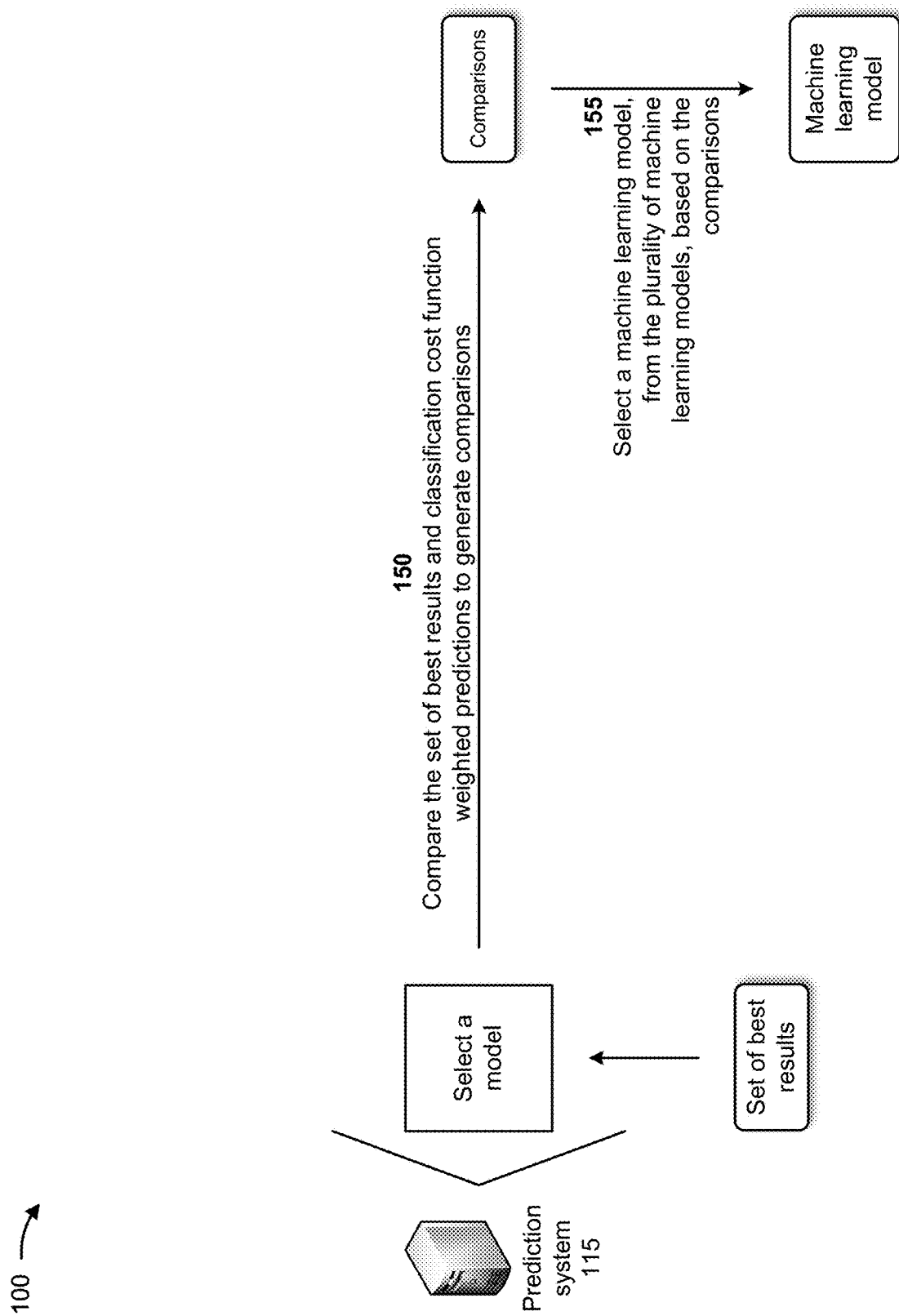

As shown in FIG. 1E, and by reference number 150, the prediction system 115 may compare the set of best results and classification cost function weighted predictions to generate comparisons. For example, a cost function is a technique for evaluating a performance of a machine learning model. The cost function may analyze the predicted outputs of the plurality of machine learning models (e.g., the set of best results) and actual outputs, and may calculate accuracies of the predicted outputs of the plurality of machine learning models. The cost function may generate a higher value if predicted outputs differ a lot from the actual outputs. In some implementations, the prediction system 115 may utilize the values generated by the cost function to assign rankings to the set of best results, and may generate a ranked list of the set of best results based on the rankings.

As further shown in FIG. 1E, and by reference number 155, the prediction system 115 may select a machine learning model, from the plurality of machine learning models, based on the comparisons. For example, when the comparisons include a ranked list of the set of best results, the prediction system 115 may select the machine learning model, from the plurality of machine learning models, based on the ranked list of the set of best results. In some implementations, the prediction system 115 may select, as the machine learning model, a machine learning model associated with a first result provided in the ranked list of the set of best results.

Figure 1F:
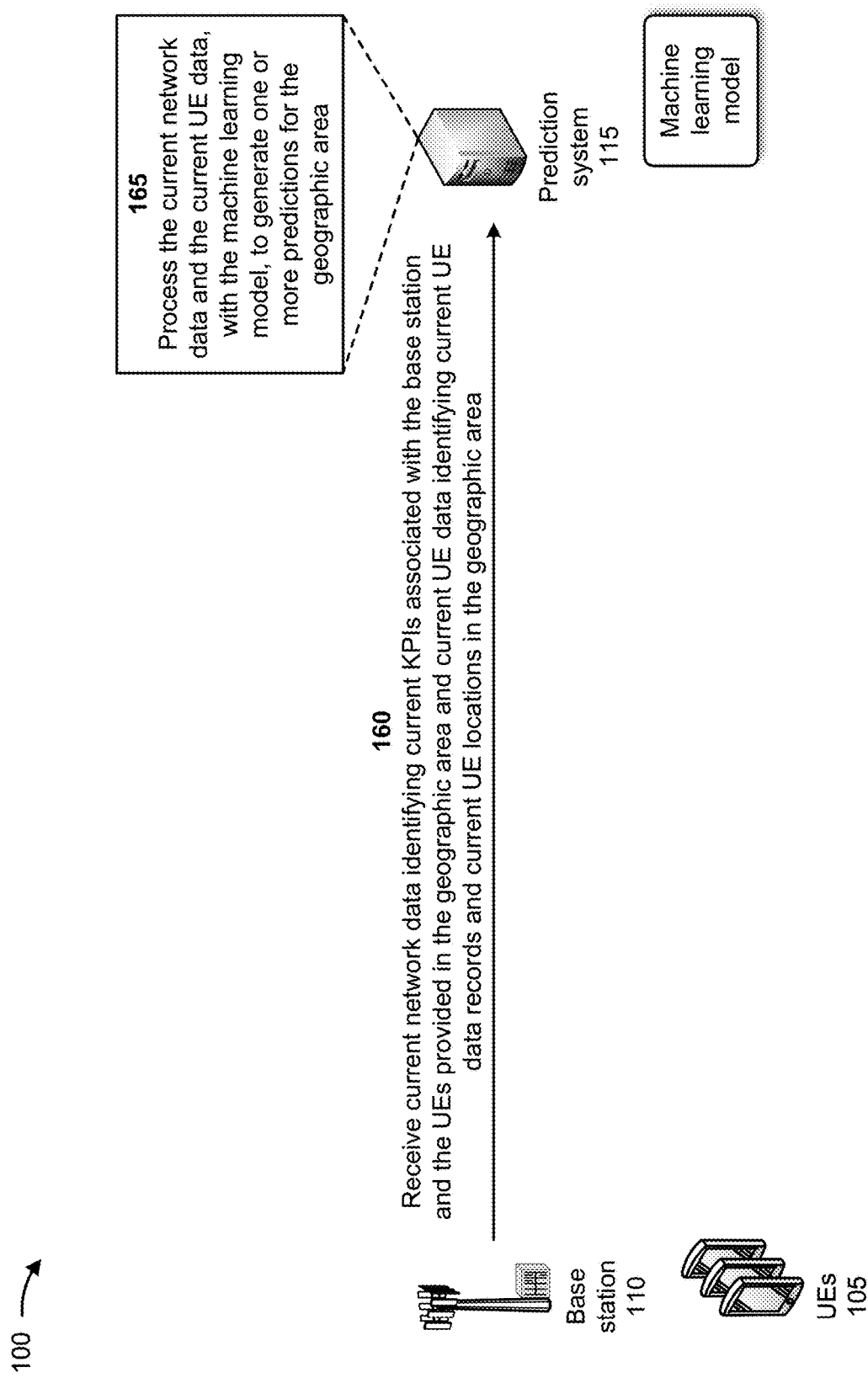

As shown in FIG. 1F, and by reference number 160, the prediction system 115 may receive current network data identifying current KPIs associated with the base station 110 and the UEs 105 provided in the geographic area and current UE data identifying current UE data records and current UE locations in the geographic area. For example, the current network data (e.g., the current KPIs) may include current bandwidths, current throughputs, current signal strengths, current indications of service availability, current indications of network resources, current indications of handovers, current voice service indicators, current data service indicators, and/or the like. The current UE data may include data identifying current call records associated with the UEs 105, current application utilization by the UEs 105, current data usage associated with the UEs 105, current geographic locations of the UEs 105 in the geographic area, and/or the like. The prediction system 115 may periodically receive the current network data and/or the current UE data from the UEs 105 and/or the base station 110, may continuously receive the current network data and/or the current UE data from the UEs 105 and/or the base station 110, may receive the current network data and/or the current UE data based on providing a request for the current network data and/or the current UE data to the UEs 105 and/or the base station 110, and/or the like.

As further shown in FIG. 1F, and by reference number 165, the prediction system 115 may process the current network data and the current UE data, with the machine learning model, to generate one or more predictions for the geographic area. For example, the prediction system 115 may process the current network data and the current UE data, with the machine learning model, to generate one or more predictions of subscriber experiences in the geographic area at a current time. The subscriber experiences may include latencies, throughputs, quality of service, and/or the like received by the UEs 105 from the base station 110. The prediction system 115 may utilize the predicted subscriber experiences to perform one or more actions, as described below.

In some implementations, the prediction system 115 may provide the machine learning model to the base station 110, and the base station 110 may process the current network data and the current UE data, with the machine learning model, to generate the one or more predictions of the subscriber experiences in the geographic area at a current time.

Figure 1G:
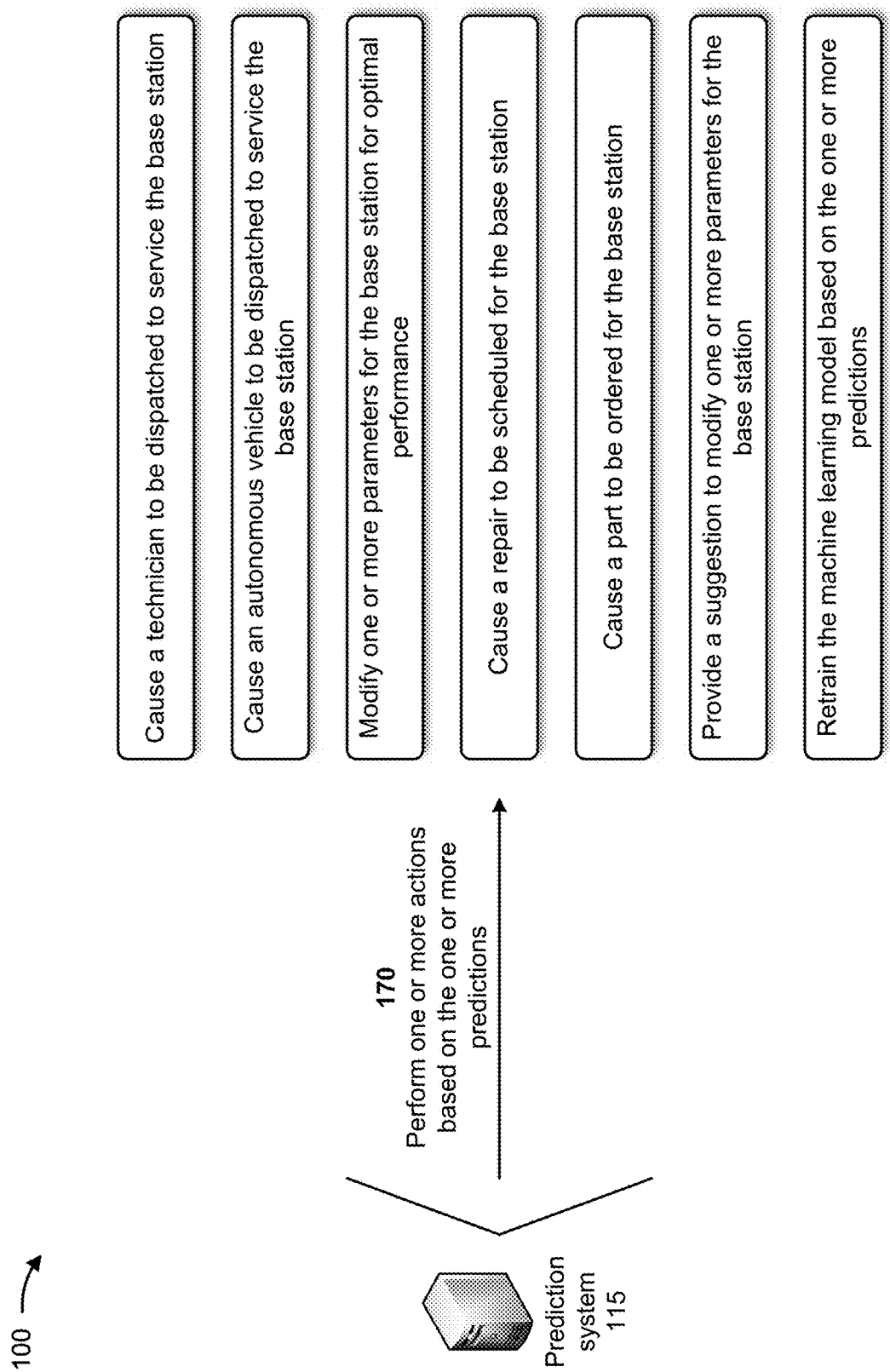

As shown in FIG. 1G, and by reference number 170, the prediction system 115 may perform one or more actions based on the one or more predictions. In some implementations, performing the one or more actions includes the prediction system 115 causing a technician to be dispatched to service the base station 110. For example, the prediction system 115 may provide, to a technician (e.g., to a UE 105 of the technician), a notification identifying an issue with the base station 110. The technician may utilize the notification to travel to the base station 110 and attempt to correct the issue. In this way, the prediction system 115 may conserve computing resources, networking resources, and/or other resources that would have otherwise been consumed by dispatching technicians to unsuccessfully investigate false issues for the base station 110.

In some implementations, performing the one or more actions includes the prediction system 115 causing an autonomous vehicle to be dispatched to service one of the antennas. For example, the prediction system 115 may provide, to an autonomous vehicle (e.g., a drone, a robot, and/or the like), instructions identifying the base station 110 and an issue to correct in the base station 110. The autonomous vehicle may utilize the instructions to travel to the base station 110 and attempt to correct the issue. In this way, the prediction system 115 may conserve computing resources, networking resources, and/or other resources that would have otherwise been consumed by dispatching autonomous vehicles to unsuccessfully investigate false issues for the base station 110.

In some implementations, performing the one or more actions includes the prediction system 115 modifying one or more parameters for the base station 110. For example, the prediction system 115 may identify the base station 110 as experiencing a problem, and may determine parameters of the base station 110 to modify (e.g., adjust an antenna angle, increase antenna power, and/or the like) in order to correct the problem. The prediction system 115 may instruct the base station 110 to modify the parameters in order to correct the problem. In this way, the prediction system 115 may conserve computing resources, networking resources, and/or other resources that would have otherwise been consumed by handling lost data caused by the antenna experiencing the problem or handling false positive alerts.

In some implementations, performing the one or more actions includes the prediction system 115 causing a repair to be scheduled for one of the base station 110. For example, the prediction system 115 may schedule a technician or an autonomous vehicle to be dispatched to repair an antenna of the base station 110. The prediction system 115 may review availabilities of technicians or autonomous vehicles when scheduling the technician or the autonomous vehicle for repairing the antenna of the base station 110. In this way, the prediction system 115 may conserve computing resources, networking resources, and/or other resources that would have otherwise been consumed by unnecessarily modifying parameters of the base station 110 based on poor estimates of subscriber experience.

In some implementations, performing the one or more actions includes the prediction system 115 causing a part to be ordered for the base station 110. For example, the prediction system 115 may determine that a part of an antenna of the base station 110 needs to be replaced, and may order the part from a supplier of the part. The replacement part, when installed, may cause the base station 110 to correctly function. In this way, the prediction system 115 may conserve computing resources, networking resources, and/or other resources that would have otherwise been consumed by providing a poor customer experience while waiting for the new part for the antenna to be available and ready to replace the malfunctioning part.

In some implementations, performing the one or more actions includes the prediction system 115 providing a suggestion to modify one of the parameters for the base station 110. For example, the prediction system 115 may determine that a parameter (e.g., a tilt angle) associated with an antenna of the base station 110 is incorrect, and may determine a modification to the parameter. The prediction system 115 may provide a suggestion for the modification to a technician responsible for the base station 110. In this way, the prediction system 115 may conserve computing resources, networking resources, and/or other resources that would have otherwise been consumed by providing a poor customer experience to customers associated with the base station 110 that requires a parameter modification.

In some implementations, performing the one or more actions includes the prediction system 115 retraining the machine learning model based on the one or more predictions. For example, the prediction system 115 may utilize the one or more predictions as additional training data for retraining the machine learning model, thereby increasing the quantity of training data available for training the machine learning model. Accordingly, the prediction system 115 may conserve computing resources associated with identifying, obtaining, and/or generating historical data for training the machine learning model relative to other systems for identifying, obtaining, and/or generating historical data for training machine learning models.

In this way, the prediction system 115 selects a machine learning model for predicting a subscriber network experience in a geographic area. For example, the prediction system may utilize network data, subscriber UE 105 data, estimated locations of the UEs 105, and enriched geographic data to train and select a machine learning model that identifies a performance of a network in specific geographic area. The prediction system 115 may utilize the machine learning model to predict a subscriber experience of a UE 105 as the UE 105 moves through a serving cell of the network from a geographic perspective. The prediction system 115 may implement proactive network improvements and real-time device level optimization based on the predicted subscriber experience. Thus, the prediction system 115 may conserve computing resources, networking resources, and/or other resources that would have otherwise been consumed by providing a poor subscriber experience in a serving cell of the network or in portions of the serving cell, dispatching technicians to service the network based poor estimates of the subscriber experience for the serving cell, unnecessarily modifying parameters of the network based on the poor estimates of the subscriber experience for the serving cell, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
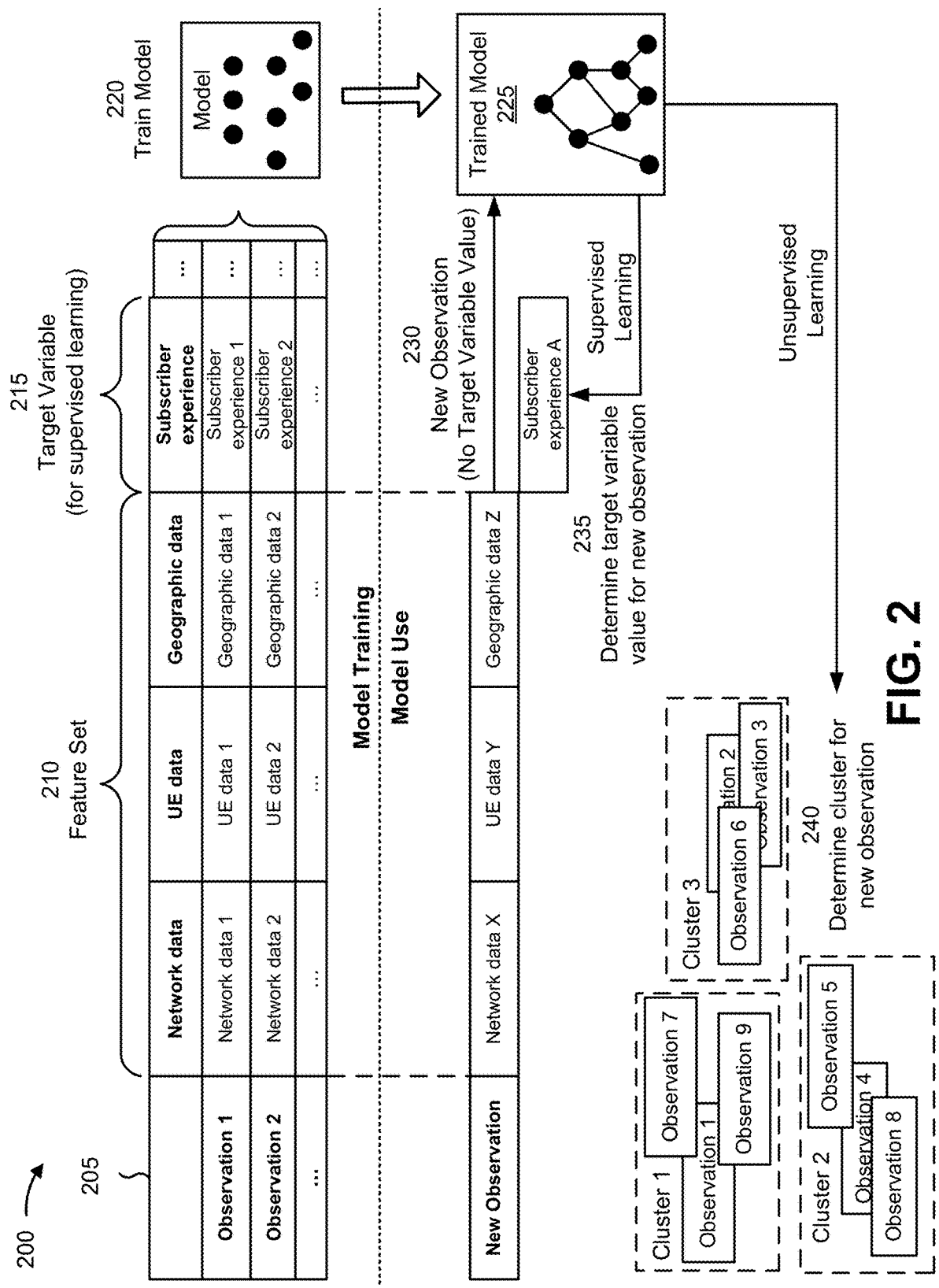
FIG. 2 is a diagram illustrating an example of training and using a machine learning model.

FIG. 2 is a diagram illustrating an example 200 of training and using a machine learning model to predict a subscriber network experience in a geographic area. The machine learning model training and usage described herein may be performed using a machine learning system. The machine learning system may include or may be included in a computing device, a server, a cloud computing environment, and/or the like, such as the prediction system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the prediction system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of network data, a second feature of UE data, a third feature of geographic data, and so on. As shown, for a first observation, the first feature may have a value of network data 1, the second feature may have a value of UE data 1, the third feature may have a value of geographic data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled subscriber experience and may include a value of subscriber experience 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of network data X, a second feature of UE data Y, a third feature of geographic data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of subscriber experience A for the target variable of the subscriber experience for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a network data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a UE data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict a subscriber network experience in a geographic area. The machine learning system enables recognition and/or identification of tens, hundreds, thousands, or millions of features and/or feature values for tens, hundreds, thousands, or millions of observations, thereby increasing accuracy and consistency and reducing delay associated with predicting a subscriber network experience in a geographic area relative to requiring computing resources to be allocated for tens, hundreds, or thousands of operators to manually predict a subscriber network experience in a geographic area.

As indicated above, FIG. 2 is provided as an example. Other examples may differ from what is described in connection with FIG. 2.

Figure 3:
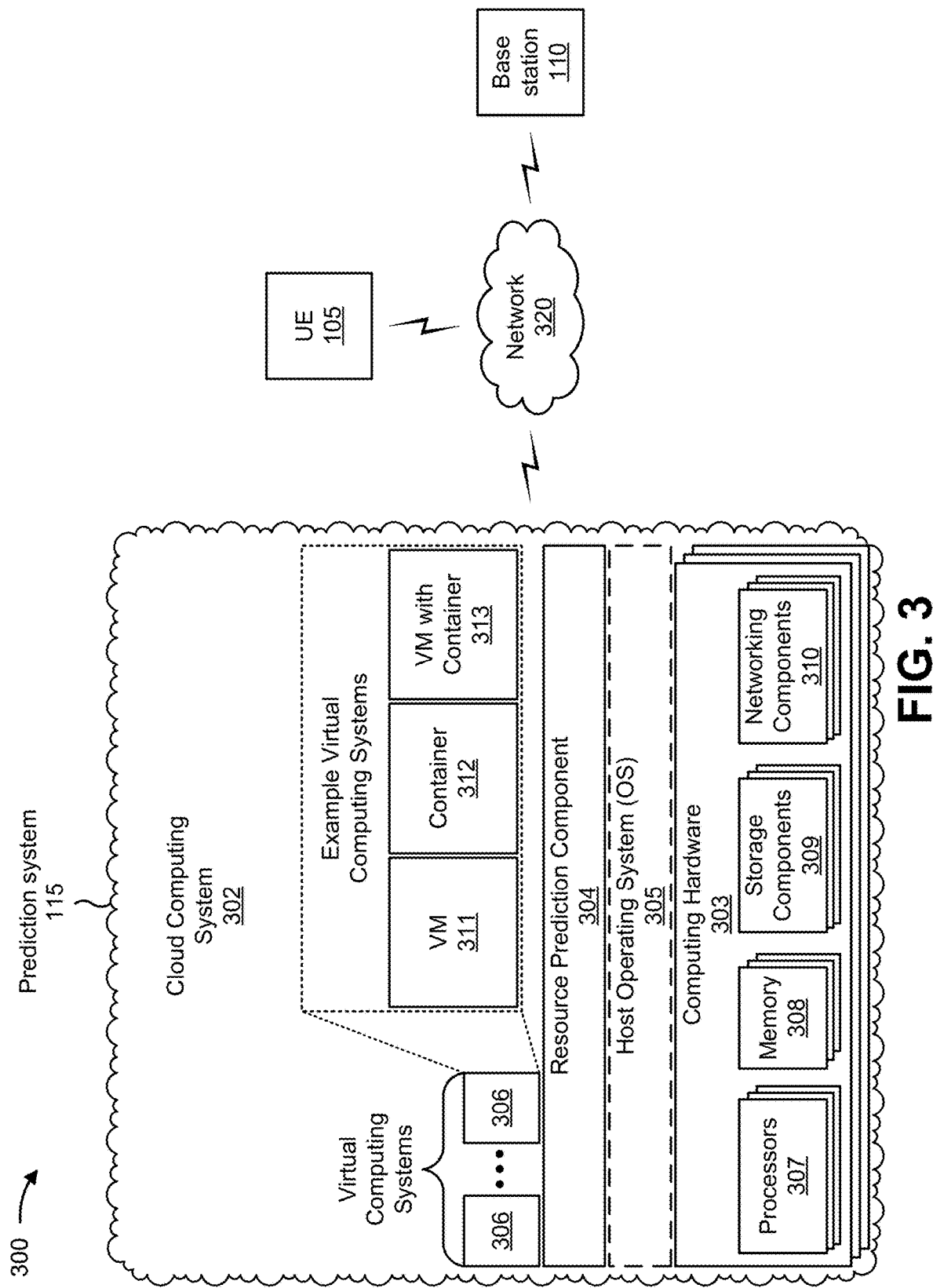
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the prediction system 115, which may include one or more elements of and/or may execute within a cloud computing system 302. The cloud computing system 302 may include one or more elements 303-313, as described in more detail below. As further shown in FIG. 3, the environment 300 may include the UE 105, the base station 110, and/or a network 320. Devices and/or elements of the environment 300 may interconnect via wired connections and/or wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The base station 110 includes one or more devices capable of transferring traffic, such as audio, video, text, and/or other traffic, destined for and/or received from a UE. For example, the base station 110 may include an eNodeB (eNB) associated with a long term evolution (LTE) network that receives traffic from and/or sends traffic to a core network, a gNodeB (gNB) associated with a RAN of a fifth generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 110 may support, for example, a cellular radio access technology (RAT). The base station 110 may transfer traffic between a UE (e.g., using a cellular RAT), one or more other base stations 110 (e.g., using a wireless interface or a backhaul interface, such as a wired backhaul interface), and/or a core network. The base station 110 may provide one or more cells that cover geographic areas.

In some implementations, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some implementations, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some implementations, the term "base station," "network node," or "network entity" may refer to one device configured to perform one or more functions, such as those described herein in connection with the base station 110. In some implementations, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some implementations, the term "base station," "network node," or "network entity" may refer to one or more virtual base stations and/or one or more virtual base station functions. For example, in some implementations, two or more base station functions may be instantiated on a single device. In some implementations, the term "base station," "network node," or "network entity" may refer to one of the base station functions and not another. In this way, a single device may include more than one base station.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the prediction system 115 may include one or more elements 303-313 of the cloud computing system 302, may execute within the cloud computing system 302, and/or may be hosted within the cloud computing system 302, in some implementations, the prediction system 115 may not be cloud-based (e.g., may be implemented outside of a cloud computing system) or may be partially cloud-based. For example, the prediction system 115 may include one or more devices that are not part of the cloud computing system 302, such as the device 400 of FIG. 4, which may include a standalone server or another type of computing device. The prediction system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
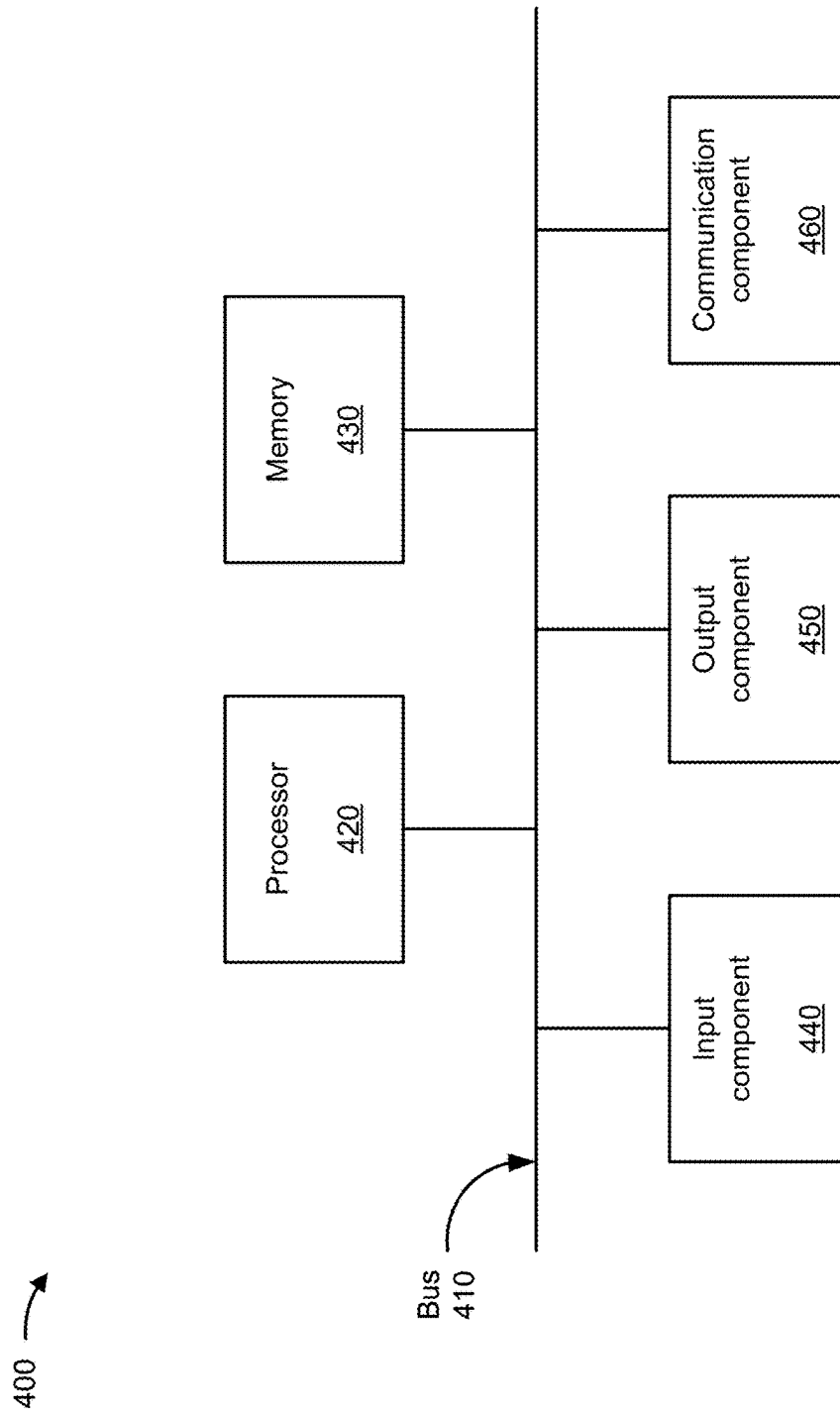
FIG. 4 is a diagram of example components of one or more devices of FIG. 3.

FIG. 4 is a diagram of example components of a device 400, which may correspond to the UE 105, the base station 110, and/or the prediction system 115. In some implementations, the UE 105, the base station 110, and/or the prediction system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for selecting a machine learning model that predicts a subscriber network experience in a geographic area. In some implementations, one or more process blocks of FIG. 5 may be performed by a device (e.g., the prediction system 115). In some implementations, one or more process blocks of FIG. 5 may be performed by another device or a group of devices separate from or including the device, such as a base station (e.g., the base station 110). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving network data identifying KPIs associated with a base station and UEs provided in a geographic area (block 505). For example, the device may receive network data identifying KPIs associated with a base station and UEs provided in a geographic area, as described above. In some implementations, the geographic area is defined by geographic identifiers and associated grid reference system identifiers.

As further shown in FIG. 5, process 500 may include receiving UE data identifying data records and locations in the geographic area (block 510). For example, the device may receive UE data identifying UE data records and UE locations in the geographic area, as described above.

As further shown in FIG. 5, process 500 may include receiving geographic data identifying the geographic area (block 515). For example, the device may receive geographic data identifying the geographic area and features of the geographic area, as described above.

As further shown in FIG. 5, process 500 may include performing data engineering on the network data, the UE data, and the geographic data (block 520). For example, the device may perform data engineering on the network data, the UE data, and the geographic data to generate engineered network data, engineered UE data, and engineered geographic data, respectively, as described above. In some implementations, performing the data engineering on the network data, the user equipment data, and the geographic data to generate the engineered network data, the engineered user equipment data, and the engineered geographic data includes one or more of performing a data cleansing technique on the network data, the user equipment data, and the geographic data to generate the engineered network data, the engineered user equipment data, and the engineered geographic data; performing a feature engineering technique on the network data, the user equipment data, and the geographic data to generate the engineered network data, the engineered user equipment data, and the engineered geographic data; or performing a binning technique on the network data, the user equipment data, and the geographic data to generate the engineered network data, the engineered user equipment data, and the engineered geographic data. In some implementations, performing the data engineering on the geographic data to generate the engineered geographic data includes performing a geospatial feature technique on the geographic data, with geospatial data, to identify new features of the geographic area, and enhancing the geographic data with the geospatial data and the new features to generate the engineered geographic data.

As further shown in FIG. 5, process 500 may include correlating the engineered network data, the engineered UE data, and the engineered geographic data to generate correlated data (block 525). For example, the device may correlate the engineered network data, the engineered UE data, and the engineered geographic data to generate correlated data, as described above. In some implementations, correlating the engineered network data, the engineered user equipment data, and the engineered geographic data to generate the correlated data includes processing the engineered network data, the engineered user equipment data, and the engineered geographic data, with a correlation model, to generate the correlated data.

As further shown in FIG. 5, process 500 may include processing the correlated data, with a plurality of machine learning models, to generate a corresponding plurality of results (block 530). For example, the device may process the correlated data, with a plurality of machine learning models, to generate a corresponding plurality of results, as described above.

As further shown in FIG. 5, process 500 may include evaluating the plurality of results, with prediction models, to generate a set of results (block 535). For example, the device may evaluate the plurality of results, with prediction models, to generate a set of results, as described above. In some implementations, evaluating the plurality of results, with the prediction models, to generate the set of results includes evaluating the plurality of results, with a mean absolute error prediction model, to generate a first portion of the set of results, evaluating the plurality of results, with a standard deviation prediction model, to generate a second portion of the set of results, and combining the first portion and the second portion to generate the set of results. In some implementations, evaluating the plurality of results, with the prediction models, to generate the set of results includes processing the plurality of results, with the prediction models, to generate a ranked list of the plurality of results, and selecting the set of results based on the ranked list of the plurality of results.

As further shown in FIG. 5, process 500 may include comparing classification cost function weighted predictions and the set of results to generate comparisons (block 540). For example, the device may compare classification cost function weighted predictions and the set of results to generate comparisons, as described above.

As further shown in FIG. 5, process 500 may include selecting a machine learning model based on the comparisons (block 545). For example, the device may select a machine learning model, for the geographic area and from the plurality of machine learning models, based on the comparisons, as described above. In some implementations, the comparisons include a ranked list of the set of results, and the selecting the machine learning model selecting the machine learning model based on the ranked list of the set of results.

As further shown in FIG. 5, process 500 may include implementing the machine learning model for the geographic area (block 550). For example, the device may implement the machine learning model for the geographic area, as described above.

In some implementations, process 500 includes receiving current network data identifying current KPIs associated with the base station and the UEs provided in the geographic area; receiving current UE data identifying current UE data records and current UE locations in the geographic area; processing the current network data and the current UE data, with the machine learning model, to generate one or more predictions for the geographic area; and performing one or more actions based on the one or more predictions. In some implementations, performing the one or more actions includes one or more of causing a technician to be dispatched to service the base station, causing an autonomous vehicle to be dispatched to service the base station, or causing a repair to be scheduled for the base station.

In some implementations, performing the one or more actions includes one or more of modifying one or more parameters for the base station, or providing a suggestion to modify one or more parameters for the base station. In some implementations, performing the one or more actions include one or more of causing a part to be ordered for the base station, or retraining the machine learning model based on the one or more predictions. In some implementations, performing the one or more actions includes identifying a problem with the base station based on the one or more predictions; determining one or more parameters, associated with the base station, to modify in order to correct the problem with the base station; and instructing the base station to modify the one or more parameters in order to correct the problem with the base station.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
receiving, by a device, network data identifying key performance indicators associated with a base station and user equipment provided in a geographic area;

receiving, by the device, user equipment data identifying user equipment data records and user equipment locations in the geographic area;

receiving, by the device, geographic data identifying the geographic area and features of the geographic area;

performing, by the device, data engineering on the network data, the user equipment data, and the geographic data to generate engineered network data, engineered user equipment data, and engineered geographic data, respectively;

correlating, by the device, the engineered network data, the engineered user equipment data, and the engineered geographic data to generate correlated data;

processing, by the device, the correlated data, with a plurality of machine learning models, to generate a corresponding plurality of results;

evaluating, by the device, the plurality of results, with prediction models, to generate a set of results;

comparing, by the device, classification cost function weighted predictions and the set of results to generate comparisons;

selecting, by the device, a machine learning model, for the geographic area and from the plurality of machine learning models, based on the comparisons; and implementing, by the device, the machine learning model for the geographic area.

2. The method of claim 1, further comprising:

receiving current network data identifying current key performance indicators associated with the base station and the user equipment provided in the geographic area;

receiving current user equipment data identifying current user equipment data records and current user equipment locations in the geographic area;

processing the current network data and the current user equipment data, with the machine learning model, to generate one or more predictions for the geographic area; and perform one or more actions based on the one or more predictions.

3. The method of claim 2, wherein performing the one or more actions comprises one or more of:

causing a technician to be dispatched to service the base station;

causing an autonomous vehicle to be dispatched to service the base station;

causing a repair to be scheduled for the base station;

modifying one or more parameters for the base station;

providing a suggestion to modify one or more parameters for the base station;

causing a part to be ordered for the base station; or retraining the machine learning model based on the one or more predictions.

4. The method of claim 2, wherein performing the one or more actions comprises:

identifying a problem with the base station based on the one or more predictions;

determining one or more parameters, associated with the base station, to modify in order to correct the problem with the base station; and instructing the base station to modify the one or more parameters in order to correct the problem with the base station.

5. The method of claim 1, wherein performing the data engineering on the network data, the user equipment data, and the geographic data to generate the engineered network data, the engineered user equipment data, and the engineered geographic data comprises:

performing a data cleansing technique on the network data, the user equipment data, and the geographic data to generate the engineered network data, the engineered user equipment data, and the engineered geographic data.

6. The method of claim 1, wherein performing the data engineering on the network data, the user equipment data, and the geographic data to generate the engineered network data, the engineered user equipment data, and the engineered geographic data comprises:

performing a feature engineering technique on the network data, the user equipment data, and the geographic data to generate the engineered network data, the engineered user equipment data, and the engineered geographic data.

7. The method of claim 1, wherein performing the data engineering on the network data, the user equipment data, and the geographic data to generate the engineered network data, the engineered user equipment data, and the engineered geographic data comprises:

performing a binning technique on the network data, the user equipment data, and the geographic data to generate the engineered network data, the engineered user equipment data, and the engineered geographic data.

8. A device, comprising:

one or more processors configured to:

receive network data identifying key performance indicators associated with a base station and user equipment provided in a geographic area, wherein the key performance indicators include one or more of:

throughput associated with the base station and the user equipment during a time period, latency associated with the base station and the user equipment during the time period, or packet loss associated with the base station and the user equipment during the time period;

receive user equipment data identifying user equipment data records and user equipment locations in the geographic area;

receive geographic data identifying the geographic area and features of the geographic area;

perform data engineering on the network data, the user equipment data, and the geographic data to generate engineered network data, engineered user equipment data, and engineered geographic data, respectively;

correlate the engineered network data, the engineered user equipment data, and the engineered geographic data to generate correlated data;

train a plurality of machine learning models with the correlated data to generate a corresponding plurality of results;

evaluate the plurality of results, with prediction models, to generate a set of results;

compare classification cost function weighted predictions and the set of results to generate comparisons;

select a machine learning model, for the geographic area and from the plurality of machine learning models, based on the comparisons; and implement the machine learning model for the geographic area.

9. The device of claim 8, wherein the one or more processors, to correlate the engineered network data, the engineered user equipment data, and the engineered geographic data to generate the correlated data, are configured to:
    process the engineered network data, the engineered user equipment data, and the engineered geographic data, with a correlation model, to generate the correlated data.

10. The device of claim 8, wherein the one or more processors, to evaluate the plurality of results, with the prediction models, to generate the set of results, are configured to:
    evaluate the plurality of results, with a mean absolute error prediction model, to generate a first portion of the set of results;
    evaluate the plurality of results, with a standard deviation prediction model, to generate a second portion of the set of results; and
    combine the first portion and the second portion to generate the set of results.

11. The device of claim 8, wherein the one or more processors, to evaluate the plurality of results, with the prediction models, to generate the set of results, are configured to:
    process the plurality of results, with the prediction models, to generate a ranked list of the plurality of results; and
    select the set of results based on the ranked list of the plurality of results.

12. The device of claim 8, wherein the comparisons include a ranked list of the set of results, and the one or more processors, to select the machine learning model, are configured to:
    select the machine learning model based on the ranked list of the set of results.

13. The device of claim 8, wherein the geographic area is defined by geographic identifiers and associated grid reference system identifiers.

14. The device of claim 8, wherein the one or more processors, to perform the data engineering on the geographic data to generate the engineered geographic data, are configured to:
    perform a geospatial feature technique on the geographic data, with geospatial data, to identify new features of the geographic area; and
    enhance the geographic data with the geospatial data and the new features to generate the engineered geographic data.

15. A non-transitory computer-readable medium storing a set of instructions, the set of instructions comprising:
    one or more instructions that, when executed by one or more processors of a device, cause the device to:
        receive network data identifying key performance indicators associated with a base station and user equipment provided in a geographic area;
        receive user equipment data identifying user equipment data records and user equipment locations in the geographic area;
        receive geographic data identifying the geographic area and features of the geographic area;
        perform data engineering on the network data, the user equipment data, and the geographic data to generate engineered network data, engineered user equipment data, and engineered geographic data, respectively;
        correlate the engineered network data, the engineered user equipment data, and the engineered geographic data to generate correlated data;
        train a plurality of machine learning models with the correlated data to generate a corresponding plurality of results;
        evaluate the plurality of results, with prediction models, to generate a set of results;
        compare classification cost function weighted predictions and the set of results to generate comparisons;
        select a machine learning model, for the geographic area and from the plurality of machine learning models, based on the comparisons;
        receive current network data identifying current key performance indicators associated with the base station and the user equipment provided in the geographic area;
        receive current user equipment data identifying current user equipment data records and current user equipment locations in the geographic area;
        process the current network data and the current user equipment data, with the machine learning model, to generate one or more predictions for the geographic area; and
        perform one or more actions based on the one or more predictions.

16. The non-transitory computer-readable medium of claim 15, wherein the one or more instructions, that cause the device to perform the one or more actions, cause the device to one or more of:
    cause a technician to be dispatched to service the base station;
    cause an autonomous vehicle to be dispatched to service the base station; or
    cause a repair to be scheduled for the base station.

17. The non-transitory computer-readable medium of claim 15, wherein the one or more instructions, that cause the device to perform the one or more actions, cause the device to one or more of:
    modify one or more parameters for the base station;
    provide a suggestion to modify one or more parameters for the base station;
    cause a part to be ordered for the base station; or
    retrain the machine learning model based on the one or more predictions.

18. The non-transitory computer-readable medium of claim 15, wherein the one or more instructions, that cause the device to perform the data engineering on the network data, the user equipment data, and the geographic data to generate the engineered network data, the engineered user equipment data, and the engineered geographic data, cause the device to one or more of:
    perform a data cleansing technique on the network data, the user equipment data, and the geographic data to generate the engineered network data, the engineered user equipment data, and the engineered geographic data;
    perform a feature engineering technique on the network data, the user equipment data, and the geographic data to generate the engineered network data, the engineered user equipment data, and the engineered geographic data; or
    perform a binning technique on the network data, the user equipment data, and the geographic data to generate the engineered network data, the engineered user equipment data, and the engineered geographic data.

19. The non-transitory computer-readable medium of claim 15, wherein the one or more instructions, that cause the device to correlate the engineered network data, the engineered user equipment data, and the engineered geographic data to generate the correlated data, cause the device to:
  process the engineered network data, the engineered user equipment data, and the engineered geographic data, with a correlation model, to generate the correlated data.

20. The non-transitory computer-readable medium of claim 15, wherein the one or more instructions, that cause the device to evaluate the plurality of results, with the prediction models, to generate the set of results, cause the device to:
  evaluate the plurality of results, with a mean absolute error prediction model, to generate a first portion of the set of results;
  evaluate the plurality of results, with a standard deviation prediction model, to generate a second portion of the set of results; and
  combine the first portion and the second portion to generate the set of results.

* * * * *